June 27, 1961     M. A. SULLIVAN     2,990,496
APPARATUS FOR STARTING MODEL AIRPLANE ENGINES
Filed July 14, 1959
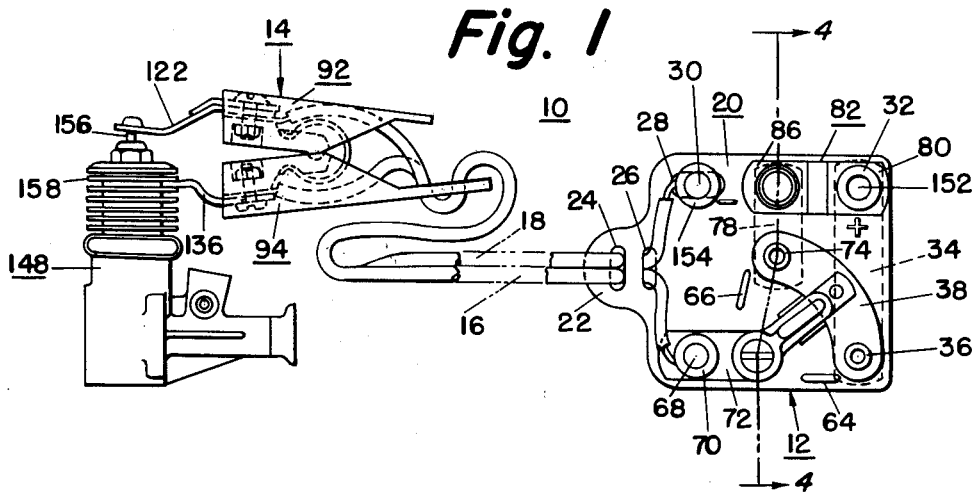
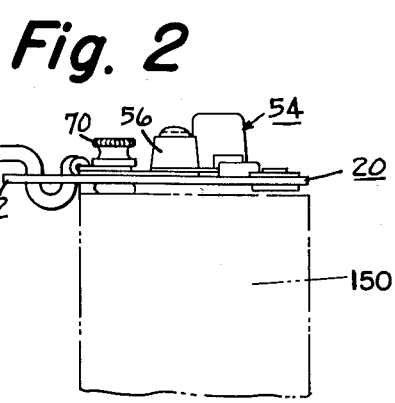
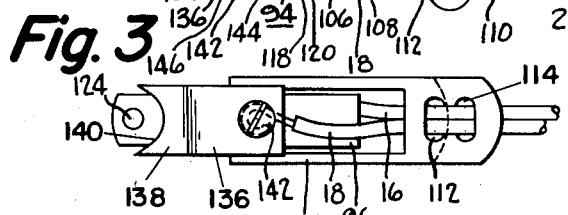
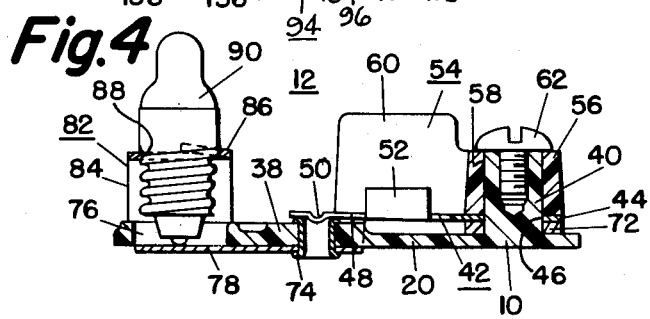
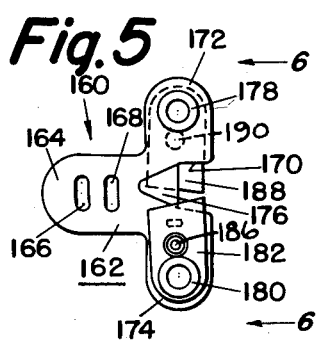
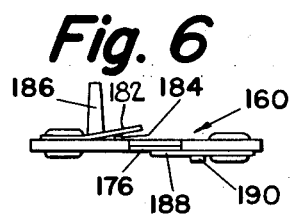
INVENTOR.
MATTHEW A. SULLIVAN
BY Arthur H. Seidel
ATTORNEY

United States Patent Office 2,990,496
Patented June 27, 1961

2,990,496
APPARATUS FOR STARTING MODEL
AIRPLANE ENGINES
Matthew A. Sullivan, 2300 Stratford Ave.,
Willow Grove, Pa.
Filed July 14, 1959, Ser. No. 826,996
17 Claims. (Cl. 317—87)

The present invention relates to an apparatus for starting model airplane engines, and more particularly to an apparatus for connecting the glow plug of a model airplane engine to a battery to permit the engine to be started.

Model airplane engines are started by means of a glow plug which is mounted on and extends into the cylinder of the engine. To start the engine, the glow plug is connected across a battery which heats the filament of the glow plug which is within the cylinder of the engine. The heated filament of the glow plug ignites the compressed gas vapors within the cylinder of the engine, and thereby starts the operation of the engine. Once the engine has started, the glow plug is disconnected from the battery. Once the operation of the engine has been started, the heat of the engine is sufficient to continue the ignition of the compressed gasoline vapors, and thereby continue the operation of the engine.

In order to start the operation of the engine, it is desirable to have an apparatus for connecting the battery to the glow plug of the engine which can be easily and quickly attached to and detached from the glow plug.

Failure of a model airplane engine to start is often caused by the filament of the glow plug being burnt out. Therefore, it is desirable to have an apparatus by which the glow plug can be easily and quickly tested to determine whether the filament has been burnt out.

It is an object of the present invention to provide a novel apparatus for starting model airplane engines.

It is another object of the present invention to provide an apparatus for connecting the glow plug of a model airpane engine across a battery to start the operation of the engine.

It is still another object of the present invention to provide an apparatus for connecting the glow plug of a model airplane engine across a battery, which apparatus can be easily and quickly connected to and detached from the glow plug.

It is a further object of the present invention to provide an apparatus for connecting the glow plug of a model airplane engine across a battery which also permits testing the operability of the glow plug.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is an elevational view of the apparatus of the present invention with the battery connector being viewed from the top, and the engine clip being viewed from the side.

FIGURE 2 is a side elevational view of the apparatus of the present invention with the engine clip being in section.

FIGURE 3 is a bottom elevational view of the engine clip of the apparatus of the present invention.

FIGURE 4 is a sectional view taken along line 4—4 of FIGURE 1.

FIGURE 5 is a top elevational view of a modification of the battery connector of the apparatus of the present invention.

FIGURE 6 is an end elevational view looking in the direction of arrows 6—6 in FIGURE 5.

Referring initially to FIGURES 1 and 2, the apparatus of the present invention for connecting the glow plug of a model airplane engine across a battery is generally designated as 10. Apparatus 10 comprises a battery connector 12, an engine clip 14, and a pair of wires 16 and 18 connected between the battery connector 12 and the engine clip 14.

Battery connector 12 comprises a substantially rectangular, flat plate 20 of a substantially rigid, electrical insulating material, such as a plastic. Plate 20 has an integral flange 22 extending from the front edge of the plate 20. Flange 22 has a pair of spaced, parallel, elongated holes 24 and 26 therethrough. Plate 20 has an elongated hole 28 therethrough in a front corner of the plate 20. Hole 28 is adapted to receive the terminal 30 of a battery. A hollow rivet 32 of an electrically conductive metal extends through and is secured to the plate 20 in a rear corner of the plate 20 which is along the same side of the plate 20 as the battery terminal receiving hole 28. Rivet 32 is adapted to receive the other terminal of the battery. A thin, flat bus-bar 34 of an electrically conductive metal is secured across the bottom surface of the plate 20 along the back edge of the plate 20. One end of the bus bar 34 is secured to the plate 20 by the rivet 32. The other end of the bus bar 34 is secured to the plate 20 by a rivet 36 of an electrical conducting metal.

The top surface of the plate 20 is provided with a narrow raised surface 38. The raised surface 38 is arcuate and extends from the rivet 36 through substantially ninety degrees to substantially the center of the plate 20. As shown in FIGURE 4, plate 20 has an upright, cylindrical pivot post 40 integral with the plate 20. Pivot post 40 is positioned on the center of rotation of the arcuate surface 38. A switch contact plate 42 of an electrically conductive metal is rotatably mounted on the pivot post 40. Switch contact plate 42 comprises a hub 44 having a hole 46 therethrough. The hub 44 of the contact plate 42 fits around the pivot post 40 so that the contact plate 42 is rotatable on the pivot post 40. An arm 48 extends from the hub 44, and is of a length to extend across the raised surface 38 of the plate 20. The end of the arm 48 has a downwardly extending projection 50 which upon rotation of the switch contact plate 42 is adapted to seat on the rivet 36. Arm 48 has a flange 52 integral with and projecting upwardly from each side of the arm 48. A switch actuating member 54 is rotatably mounted on the pivot post 40 above the switch contact plate 42. Switch actuating member 54 comprises a hub 56 having a hole 58 therethrough. The hub 56 of the switch actuating member 54 fits around the pivot post 40 above the hub 44 of the switch contact plate 42. An arm 60 extends from the hub 56 along the top surface of the arm 48 of the switch contact plate 42. The arm 60 of the switch actuating member 54 fits between the flanges 52 of the switch contact plate 42 so that rotation of the switch actuating member 54 also rotates the switch contact plate 42.

The switch actuating member 54 is made of an electrical insulating material, such as a plastic. A headed screw 62 is threaded into the top surface of the mounting post 40, and holds the switch contact plate 42 and the switch actuating member 54 on the pivot post 40. Plate 20 is provided with a pair of stop projections 64 and 66 adjacent the ends of the raised surface 38. Stop projections 64 and 66 limit the rotation of the switch actuating member 54 to the arc of the raised surface 38.

A metal terminal post 68 extends through the plate 20 in the front corner of the plate 20 adjacent the pivot post 40. A nut 70 is threaded on the terminal post 68. A thin, flat bus bar 72 of an electrically conducting metal extends along the top surface of the plate 20 between the pivot post 40 and the terminal post 68. One end of the bus bar 72 fits over the pivot post 40 beneath the hub 44 of the switch contact plate 42 (see FIGURE 4). The other end of the bus bar 72 fits over and contacts the terminal post 68. Thus, the bus bar 72 electrically connects the terminal post 68 to the switch contact plate 42.

A rivet 74 of an electrically conducting metal extends through and is secured to the plate 20 at the end of the raised surface 38 opposite the rivet 36. The rivet 74 is adapted to be engaged by the end of the arm 48 of the switch contact plate 42. As shown in FIGURE 4, plate 20 has a hole 76 therethrough adjacent the side of the plate 20, and intermediate the battery terminal receiving hole 28 and the rivet 32. A thin, flat bus bar 78 of an electrically conductive metal is secured to the bottom surface of the plate 20, and extends between the rivet 74 and the hole 76. One end of the bus bar 78 is secured to the plate 20 by the rivet 74, and the other end of the bus bar 78 extends across the hole 76. The base 80 of a lightbulb supporting bracket 82 is secured to the top surface of the plate 20 by the rivet 32. Bracket 82 has an arm extending substantially upright from the base 80, and a flange 86 extending from the top end of the arm 84 over the hole 76 in the plate 20. The flange 86 of the bracket 82 has a hole 88 therethrough which is shaped in the form of a screw thread. Bracket 82 is formed from a strip of an electrically conductive metal. A small lightbulb 90 is threaded through the hole 88 in the bracket 82, and is supported by the bracket 82.

The bottom of the lightbulb 90 extends through the hole 76 in the plate 20, and engages the bus bar 78.

The wires 16 and 18, which are electrically insulated, extend downwardly through the hole 24 in the flange 22 of the plate 20, and then upwardly through the hole 26 in the flange 22. The end of the wire 18 extends to the hole 28 in the plate 20, and is adapted to be secured to the battery terminal 30. The end of the wire 16 extends to the terminal post 68, and is secured to the terminal post 68 by the nut 70. By passing the wires 16 and 18 through the holes 24 and 26 in the flange 22 of plate 20, the wires 16 and 18 are secured to the plate 20 so that a pull on the wires 16 and 18 will not disconnect the ends of the wires from the battery terminal 30 and the terminal post 68.

Engine clip 14 comprises a pair of clip arms 92 and 94 which are pivotally connected together by a C-shaped spring 96. Clip arm 92 comprises a body 98 of an electrical insulating material, such as a plastic. Body 98 has a semi-cylindrical projection 100 extending downwardly from the back end of the flat bottom surface of the body 98. Body 98 has a pair of integral flanges 102 which extend upwardly from the sides of the body 98. Flanges 102 extend rearwardly beyond the rear end of the body 98, and are connected by a bridge 103. Clip arm 94 comprises a body 104 of an electrical insulating material, such as a plastic. Body 104 has a semi-cylindrical recess 106 in the rear end of the flat top surface of the body 104. Body 104 has a pair of integral flanges 108 extending downwardly from the sides of the body 104. Flanges 108 extend rearwardly beyond the rear end of the body 104, and are connected together by a bridge 110. Bridge 110 has a pair of spaced, parallel, elongated holes 112 and 114 therethrough. Clip arm 92 is seated on the clip arm 94 with the semi-cylindrical projection 100 of the clip arm 92 seated in the semi-cylindrical recess 106 in the clip arm 94. Spring 96 extends around the back ends of the bodies 98 and 104 of the clip arms 92 and 94. Body 98 has a recess 116 in its upper surface, and body 104 has a recess 118 in its bottom surface, in which recesses 116 and 118 the curled ends 120 of the spring 96 are seated. Thus, the spring 96 clamps the clip arms 92 and 94 together. By pressing the bridges 103 and 110 of the clip arms 92 and 94 together, the clip arms 92 and 94 are pivoted with respect to each other about the semi-cylindrical projection 100 and the semi-cylindrical recess 106 to spread the front ends of the clip arms 92 and 94 apart. The spring 96 will force the front ends of the clip arms 92 and 94 back together again.

A terminal member 122 of an electrically conductive metal has one end seated on the top surface of the body 98 of the clip arm 92 between the side flanges 102. Terminal member 122 curves downwardly, and has a cup-shaped depression 124 in the flat end portion 126 thereof. A metal leaf spring 128 extends along the back end portion of the terminal member 122. A bolt 130 extends through the back end of the leaf spring 128 and the terminal member 122, and through the body 98 of the clip arm 92 into a recess 132 in the bottom surface of the body 98. A nut 134 is threaded on the bolt 130 within the recess 132 to secure the leaf spring 128 and the terminal member 122 to the body 98. A terminal member 136 of an electrically conductive metal is seated at its back end on the bottom surface of the body 104 of the clip arm 94. Terminal member 136 curves upwardly toward the terminal member 122, and has a substantially flat front end 138. The front edge 140 of the terminal member 136 is concave. A bolt 142 extends through the back end of the terminal member 136 and through the body 104 of the clip arm 94 into a recess 144 in the top surface of the body 104. A nut 146 is threaded on the bolt 142 within the recess 144 to secure the terminal member 136 to the body 104 of the clip arm 94.

The wires 16 and 18 extend downwardly through the hole 114 in the bridge 110 of clip arm 94, and then up through the hole 112. The end portion of wire 16 extends between the side arms 102 and over the body 98 of the clip arm 92. The end of the wire 16 is clamped between the terminal member 122 and the body 98 to electrically connect the wire 16 to the terminal member 122. The end portion of wire 18 extends between the side flanges 108 and beneath the body 104 of the clip arm 94. The end of the wire 18 is clamped between the terminal member 136 and the body 104 to electrically connect the wire 18 to the terminal member 136.

The apparatus 10 of the present invention is used in the following manner to start a model airplane engine 148:

The battery connector 12 is mounted on the top of a battery 150 with one terminal 30 of the battery 150 extending through the hole 28 in the plate 20, and the other terminal 152 of the battery 150 extending through and engaging the rivet 32. The end of the wire 18 is secured to the battery terminal 30 by a nut 154 threaded on the battery terminal 30. The switching actuating member 54 is rotated to place the end of the switch contact plate 42 between the rivets 36 and 74. The front ends 126 and 138 of the terminal members 122 and 136 of the engine clip 14 are spread apart by pressing the bridges 103 and 110 of the clip arms 92 and 94 together. The cup-shaped depression 124 of the terminal member 122 is placed over the top end of the glow plug pin 156 as shown in FIGURE 1. The glow plug pin 156 is connected to one side of the glow plug filament, not shown. The end portion 138 of the terminal member 136 is inserted between two of the cooling fins 158 of the cylinder of engine 148. The other end of the glow plug filament is electrically connected to the cylinder of the engine 148 through a casing, not shown, which surrounds the glow plug pin 156. Thus, one end of the glow plug filament is electrically connected to the battery terminal 30 through the glow plug pin 156, engine clip terminal 122, and the wire 18. The other end of the glow plug filament is electrically connected to the switch contact plate 42 of the battery connector 12 through the cooling fins 158, engine clip terminal 136, the wire 16, terminal post 68, and the bus bar 72.

To start the operation of the airplane engine 148, the switch actuating member 54 is rotated to seat the end of the switch contact plate 42 on the rivet 36. The switch contact plate 42 is then electrically connected to the battery terminal 152 through the rivet 36, bus bar 34, and the rivet 32, and thereby completes the circuit between the battery 150 and the glow plug filament. When the circuit between the glow plug filament and the battery 150 is completed, the glow plug filament is heated to ignite the compressed gasoline vapors within the cylinder engine 148, and thereby starts the operation of the engine 148.

Once the operation of the engine 148 is started, the switch actuating member 54 is rotated to move the switch contact plate 42 off of the rivet 36, and thereby break the electrical connection between the glow plug filament and the battery 150. If the engine 148 continues to operate smoothly, the engine clip 14 is removed from the engine 148. However, if the operation of the engine 148 stops, the switch actuating member 54 can be rotated to move the switch contact plate 42 back onto the rivet 36 to start the engine up again.

In the event that the engine 148 fails to start, such failure may be due to a burnt out glow plug filament. To test the operability of the glow plug filament, it is only necessary to rotate the switch actuating member 54 to move the end of the switch actuating plate 42 onto the rivet 74. The switch actuating plate 42 is then electrically connected to the battery terminal 152 through the rivet 74, bus bar 78, the lightbulb 90, the bracket 82, and the rivet 32. This places the lightbulb 90 in the circuit between the glow plug filament and the battery 150. If the glow plug filament is not burnt out, current will flow through the circuit between the glow plug filament and the battery, and the lightbulb 90 will light up. However, if the glow plug filament is burnt out, no current will flow through the circuit so that the lightbulb 90 will not light up. Thus, with the apparatus 10 of the present invention the operability of the glow plug filament can be easily and quickly tested.

Referring to FIGURES 5 and 6, a modification of the battery connector for the apparatus 10 of the present invention is generally designated as 160.

Battery connector 160 comprises a flat, T-shaped plate 162 of a substantially rigid, electrical insulating material, such as a plastic. The leg 164 of the plate 162 has a pair of spaced, parallel, elongated holes 166 and 168 therethrough. The back end of the plate 162 has a substantially V-shaped notch 170 therethrough intermediate the ends of the arms 172 and 174 of the plate 162. A thin web 176 extends across the bottom portion of the notch 170 and is integral with the plate 162. Web 176 is thinner than the thickness of the plate 162.

Hollow metal rivets 178 and 180 extend through and are secured to the ends of the arms 172 and 174 respectively of the plate 162. A thin, flat plate 182 of an electrically conductive metal extends across the top surface of the arm 174 of plate 162. One end of the plate 182 is secured to the arm 174 by the rivet 180. The other end of the plate 182 projects across a portion of the notch 170. Arm 174 has an upwardly extending projection 184 which engages the bottom surface of the plate 182, and spaces the free end of the plate 182 from the arm 174. A post 186 is integral with the upper surface of the arm 174, and projects upwardly through the plate 182. A thin, flat plate 188 of an electrically conductive metal extends across the back surface of the arm 172. One end of the plate 188 is secured to the arm 172 by the rivet 178. The other end of the plate 188 projects across a portion of the notch 170. A projection 190 extends downwardly from the bottom surface of the arm 172 through the plate 188 to prevent the plate 188 from rotating with respect to the arm 172.

In the use of the battery connector 160, the wires 16 and 18 extend downwardly through the hole 166 in the leg 164 of plate 162, and then upwardly through the hole 168. The battery connector 160 is mounted on the battery 150 with the terminals of the battery extending through the rivets 178 and 180. The wires 16 and 18 are each connected to a separate one of the battery terminals. Thus, the terminal members 122 and 136 of the engine clip 14 are electrically connected to the battery terminals. When the terminal clip 14 is connected to the airplane engine 148 in the manner previously described, the glow plug filament is immediately electrically connected across the terminals of the battery. Thus, the glow plug filament is heated to ignite the compressed gasoline vapors in the engine 148 to start the engine. When the operation of the engine 148 is started, the engine clip 14 is removed from the engine.

To test the operability of the glow plug with the battery connector 160, the glow plug is first removed from the engine 148. The casing of the glow plug is placed against the free end of the metal plate 182, and the glow plug pin 156 is inserted through the notch 170 to contact the free end of the metal plate 182. Thus, the glow plug filament is connected across the terminals of the battery. If the glow plug filament, which is visible, is not broken, it will heat up and glow. However, if the glow plug filament is broken, it will not glow. The post 186 of the battery connector 160 will prevent any objects from accidentally falling across the battery terminals, and thereby prevent shorting of the battery.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for electrically connecting the glow plug of a model airplane engine across a battery comprising a battery connector, said battery connector including a plate of an electrical insulating material having a pair of spaced holes therethrough, said holes being adapted to receive the terminals of a battery, an engine clip, said engine clip including a pair of clip arms of electrical insulating material, said clip arms being pivotally connected together, and a separate terminal member of an electrically conductive metal secured to and projecting from each of said clip arms, said terminal members being insulated from each other by said clip arms and a pair of wires extending between said engine clip and said battery connector, one end of each of said wires being electrically connected to a separate one of said terminal members of said engine clip, and the other end of each of said wires extending to said spaced holes and adapted to be electrically connected to the terminals of the battery.

2. Apparatus in accordance with claim 1 in which a flange projects from the front edge of the battery connector plate, said flange having a pair of spaced holes therethrough, and the wires extend down through one of said holes and up through the other of said holes to secure the wires to the battery connector.

3. Apparatus in accordance with claim 2 in which one of the clip arms of the engine clip has a pair of spaced holes therethrough, and the wires extend down through one of said holes and up through the other of said holes to secure the wires to the engine clip.

4. Apparatus in accordance with claim 1 in which the battery connector includes means for testing the operability of the glow plug of the airplane engine.

5. Apparatus for electrically connecting the glow plug of a model airplane engine across a battery comprising a battery connector, said battery connector including a plate of an electrical insulating material having a hole therethrough adapted to receive a terminal of a battery, a hollow metal rivet extending through and secured to said plate, said rivet adapted to receive the other terminal of the battery, a metal switch contact rivet extending through and secured to said plate, a metal switch contact plate rotatably mounted on the top surface of said plate and adapted to engage said contact rivet, and means electrically connecting said contact rivet to said hollow rivet, an engine clip, said engine clip including a pair of clip arms of an electrical insulating material, said clip arms being pivotally connected together and a separate terminal member of an electrically conductive metal secured to and projecting from each of said clip arms, and a pair of wires extending between said engine clip and said battery connector, one end of each of said wires being electrically connected to a separate one of said terminal members of said engine clip, the other end of one of said wires extending to the hole in the battery connector plate, and the other end of said other wire being electrically connected to said switch contact plate.

6. Apparatus in accordance with claim 5 in which the means electrically connecting the switch contact rivet to the hollow rivet comprises a flat metal bus bar extending across the back surface of said battery connector plate, said bus bar being secured to said plate by said switch contact rivet and said hollow rivet.

7. Apparatus in accordance with claim 6 including a metal terminal post extending through the battery connector plate, a nut threaded on said terminal post, a flat metal bus bar electrically connecting said terminal posts to the switch contact plate, and the end of the wire electrically connected to said switch contact plate being secured to said terminal post.

8. Apparatus in accordance with claim 5 including a second metal switch contact rivet extending through and secured to the battery connector plate, said second switch contact rivet being adapted to be engaged by the switch contact plate, a small lightbulb mounted on the top surface of the battery connector plate, and means electrically connecting said lightbulb between said second switch contact rivet and the hollow rivet.

9. Apparatus in accordance with claim 8 in which the means electrically connecting the lightbulb to the hollow rivet comprises a metal bracket, said bracket having a base which is secured to the top surface of the battery connector plate by said hollow rivet, and a flange which is spaced from and substantially parallel to the top surface of said plate, said flange having a hole therethrough, said lightbulb extending through and supported in the hole in the flange of said bracket, and the means electrically connecting said lightbulb to the second switch contact rivet comprises a thin metal bus bar extending across a surface of said battery connector plate, one end of said bus bar being secured to said plate by the second switch contact rivet, and the lightbulb engaging said bus bar.

10. Apparatus in accordance with claim 9 in which the battery connector plate has a hole therethrough beneath the lightbulb, the bus bar from the second switch contact rivet is on the back surface of said plate and extends across said hole, and the lightbulb extends through said hole and engages said bus bar.

11. Apparatus in accordance with claim 8 in which the top surface of the battery connector plate has a raised surface extending along an arc, the switch contact rivets extend through said plate at opposite ends of said raised surface, and the switch contact plate is rotatably mounted on a pivot post which projects from the top surface of said plate at the center of rotation of the arc of the raised surface.

12. Apparatus in accordance with claim 11 including a switch actuating member of an electrical insulating material rotatably mounted on the pivot post over the switch contact plate, said switch actuating member being drivingly connected to said switch contact plate.

13. Apparatus in accordance with claim 12 including a pair of stop projections extending upwardly from the top surface of the battery connector plate said stop projections being adjacent opposite ends of the raised surface on said plate and being engageable by said switch contact plate to limit rotation of said switch contact plate.

14. Apparatus for electrically connecting the glow plug of a model airplane engine across a battery comprising a battery connector, said battery connector including a substantially flat T-shape plate of an electrical insulating material, a separate hollow metal rivet extending through and secured to the end of each arm of said plate, a notch in the back edge of said plate intermediate the ends of the arms, a separate flat metal plate extending across each of said arms, said metal plates being on opposite sides of said battery connector plate, each of said metal plates being secured to its respective arm by the rivet on said arm, and each of said plates extending across a portion of said notch, and a pair of spaced holes in the leg of said battery connector plate, an engine clip, said engine clip including a pair of clip arms of electrical insulating material, said clip arms being pivotally connected together, and a separate terminal member of an electrically conductive metal secured to and projecting from each of said clip arms, and a pair of wires extending between said engine clip and said battery connector, one end of each of said wires being connected to a separate one of the engine clip terminal members, and the other end portion of said wires extending down through one of the holes in the leg of the battery connector plate and up through the other of the holes in the leg of the battery connector plate.

15. Apparatus in accordance with claim 14 including a post integral with one of the arms of the battery connector plate, said post projecting from said one arm through the metal plate on said one arm.

16. Apparatus for electrically connecting the glow plug of a model airplane engine across a battery comprising a battery connector, said battery connector including a plate of electrical insulating material having a pair of space holes therethrough, said holes being adapted to receive the terminals of a battery, an engine clip, said engine clip including a pair of clip arms of electrical insulating material, each of said clip arms having a body, a pair of side flanges, said side flanges projecting beyond the rear end of said body, and a bridge connecting the rear ends of said side flanges, the bodies of said clip arms being in mating engagement, a semi-cylindrical recess in the mating surface of the body of one of said clip arms, a semi-cylindrical projection on the mating surface of the body of the other clip arm seated in the semi-cylindrical recess, a C-shaped spring extending around the back ends of the bodies of said clip arms and clamping said clip arms together, and a separate terminal member of an electrically conductive metal secured to and projecting forwardly from the body of each of said clip arms, and a pair of wires extending between said engine clip and said battery connector, one end of each of said wires being electrically connected to a separate one of said terminal members of said engine clip, and the other end of each of said wires extending to said spaced holes and adapted to be electrically connected to the terminals of the battery.

17. Apparatus in accordance with claim 16 in which one of the terminal members of the engine clip has a cup-shaped recess in its outer end, and the end surface of the other terminal member is concave.

References Cited in the file of this patent

UNITED STATES PATENTS

| | | |
|---|---|---|
| 1,432,003 | West | Oct. 17, 1922 |
| 1,514,555 | Meehan | Nov. 4, 1924 |
| 1,987,025 | Peterson | Jan. 8, 1935 |
| 2,361,204 | Hollins | Oct. 24, 1944 |
| 2,467,591 | Lidfeldt | Apr. 19, 1949 |
| 2,639,341 | Truax | May 19, 1953 |